United States Patent [19]

Korte et al.

[11] 4,249,217

[45] Feb. 3, 1981

[54] SEPARATED SENSOR ARRAY ABUTMENT

[75] Inventors: Eugene C. Korte; Karen C. Rayburn, both of Boulder, Colo.

[73] Assignee: International Business Machines Corporation, Armonk, N.Y.

[21] Appl. No.: 43,208

[22] Filed: May 29, 1979

[51] Int. Cl.³ .................... H04N 1/02; H01J 40/14; G06K 9/00

[52] U.S. Cl. ........................ 358/294; 340/146.3 F

[58] Field of Search ............ 358/294, 213, 212, 256, 358/281, 285, 293; 340/146.3 F; 250/208, 209, 578, 235

[56] References Cited

U.S. PATENT DOCUMENTS

| | | | |
|---|---|---|---|
| 3,170,032 | 2/1965 | Evans, Jr. et al. | 358/294 |
| 3,962,681 | 6/1976 | Requa et al. | 340/146.3 H |
| 4,005,285 | 1/1977 | Price | 250/208 |
| 4,009,388 | 2/1977 | Seachman | 250/208 |
| 4,092,632 | 5/1978 | Agulnek | 340/146.3 F |
| 4,146,786 | 3/1978 | Agulnek | 358/213 |

Primary Examiner—Robert L. Griffin
Assistant Examiner—Edward L. Coles
Attorney, Agent, or Firm—Joscelyn G. Cockburn

[57] ABSTRACT

A composite electronic image of a straight line which is generated from the overlapping arrays of a multiple array scanner is linearly abutted by projecting a vertical footprint of a reference pattern onto the multiple arrays. A first count and a second count representative of the number of pixels obliterated by the footprint is taken within the overlapping zone of the arrays and outside of the overlapping zone, respectively. The difference between the counts is used to identify the crossover point from one array to the next.

14 Claims, 9 Drawing Figures

SEPARATED SENSOR ARRAY ABUTMENT

CROSS REFERENCE TO RELATED PATENT APPLICATION

The present application is related to Application Ser. No. 066,740, filed on Aug. 15, 1979, in the name of Sherwood Kantor et al and entitled "Electronic Control System For Multiple Array Scanners". Whereas the present application discloses a method and apparatus for effectuating abutment in a multiple array scanner, the referenced application discloses a method and an apparatus for correcting alignment, abutment and skew in a scanner.

BACKGROUND OF THE INVENTION

1. Field of the Invention

The present invention relates to scanners and, more particularly to scanners having multiple arrays wherein an electronic image of an original document is generated from the arrays.

2. Description of The Prior Art

The use of scanners for generating electronic images of an original document is well known in the prior art. Prior art scanners may be classified into two groups. The so called low resolution scanners and the so called high resolution scanners.

In the low resolution scanners a straight line of information on an original document is projected onto a linear diode array. The linear array outputs a video signal representative of the line of information on the original. With the low resolution scanners there is a one to one relationship between the length of the line of information on the original document and the length of the array which generates the video signal. In other words, the length of the array spans the width of a line of information on the original document. Thus a single linear array is used to project a line of data from an original document.

With the high resolution scanners two or more linear arrays, each including a plurality of serially configured picture elements, are used for generating the video signal for a straight line of data on an original document. In order to achieve the high resolution each character on a straight line of an original document is divided or partitioned into a plurality of Picture Elements (hereinafter called pixels or pel). A typical pel size is within the range of several microns. Each pel in the character is projected onto a pel or element in the linear arrays. As such, a relatively large number of diodes are needed to reproduce a video signal representative of a straight line of data on an original document.

It would be desirable to have the large number of elements required for a high resolution scanner packaged in a single linear array so that the array spans the width of a line on an original document. However, due to limitations imposed by the physical size of the scanner, the mechanical configuration of the arrays and, more important, due to limitations imposed by the solid state or semi-conductor technology the number of pixels positioned linearly on a substrate (that is the length of an array) is fewer than the number of diodes necessary to reproduce a high resolution copy of an original document. In other words, the length of a linear array is shorter than the width of a data line on an original document.

The aforementioned imposed limitations are overcome by projecting a straight line of a document onto a plurality of linear arrays. With respect to the straight line of data, running from left to right on a page, the arrays are positioned in an over-lapping offsetting fashion. Stated another way, in order to generate a video signal representative of a straight line of data extending from a left margin to a right margin of an original document, a first linear array is positioned so as to cover a portion of the line. A second linear array is positioned so that the beginning pixels in the second linear arrays overlap with the ending pixel of the first linear array.

Likewise, a third through N linear array is arranged in a fashion similar to that described for the first and second arrays (that is overlapping arrangement between consecutive arrays) until the line on the original document is covered. Although the arrays do not lie in the same plane, usually the arrays are offset, with respect to one another, in the direction of scan. Also the arrays are overlapped in a direction parallel to a line on the original document. By way of prior art example, U.S. Pat. Nos. 4,005,285 and 4,092,632 give a more detailed description of a multiple array scanner.

One type of problem which is associated with the prior art multiple array scanners is the so called abutment problem. The abutment problem usually occurs at the junction point or crossover point of successive arrays. The abutment problem generally manifests itself in two forms. In one form the video information at the crossover point is redundant. The redundant information arises because for some finite period of time common information from a line on a document is projected onto the overlapped elements of the arrays. The other form by which the alignment error manifests itself is that of separation. This means that the video output from succeeding arrays are separated by a gap.

In order to effectuate abutment between data outputted from the different arrays used for scanning, a straight line of an original document, a vernier scale, is fabricated on one of the arrays. The vernier scale is located at the overlapping portion of the arrays. The vernier scale is achieved by placing the photosensitive elements of the verniered section on a center-to-center distance which is shorter than the center-to-center distance between the non verniered section of the arrays. The reduction in center-to-center distance between elements in the verniered section of the array provides at least one point where the arrays are in alignment. The point is called the crossover point. The crossover point is determined by microscopic examination of the arrays and moving one of the arrays to achieve abutment. By way of example, a more detailed description of the prior art method of correcting abutment is given in the aforementioned U.S. Pat. No. 4,092,632.

Although the prior art approach to correcting abutment error associated with multiple array scanners appears to perform satisfactorily, it is lacking in some respect. For example, the prior art requires a physical orientation of the arrays to correct for abutment. The frequency with which abutment is needed may influence the throughput from the scanner since a trained technician is needed to make the necessary adjustment.

Moreover, in order to correct for abutment at least one of the arrays has to be custom made in order to have the reduced center-to-center distance needed in the verniered portion of the array. As is well known to those skilled in the art, custom built electronic components tend to be much more expensive than off the shelf components. Expensive components tend to increase the overall cost of the system.

SUMMARY OF THE INVENTION

It is therefore the object of the present invention to generate a control system which effectuates abutment in a multiple array scanner in a more efficient manner than has heretofore been possible.

It is another object of the present invention to automatically and dynamically abut a plurality of electronic images to form a continuous straight image of an object.

It is still a further object of the present invention to electronically abut the sections of an image generated from a multiple array scanner to form a continuous straight object.

The above drawbacks in the prior art and the above objects are achieved by the present invention wherein electronic means effectuates automatic and dynamic abutment on a line of scanned data.

More particularly, a vertical test pattern including a vertical line is positioned at the object plane of the scanner. The vertical line is positioned perpendicular with respect to the alignment axis of the arrays. An image of the line is projected onto the arrays. The pixels in the arrays, which are covered by the footprint of the vertical line will generate a relatively low video output signal. The pixels, in the arrays, which are not covered by the vertical line will generate a relatively high video output signal. The line is first positioned at test points outside of the overlapping zone of the arrays and at test points inside of the overlapping zone. By counting the number of pixels which have relatively low video output signals at the test points, at least two different numbers are obtained. The algebraic sum of the numbers generates an error count which is used to adjust the starting pixel in the next array.

The foregoing and other objects, features and advantages of the invention will be apparent from the following more particular description of preferred embodiments of the invention, as illustrated in the accompanying drawings.

DESCRIPTION OF THE PREFERRED EMBODIMENT

Figure 1:
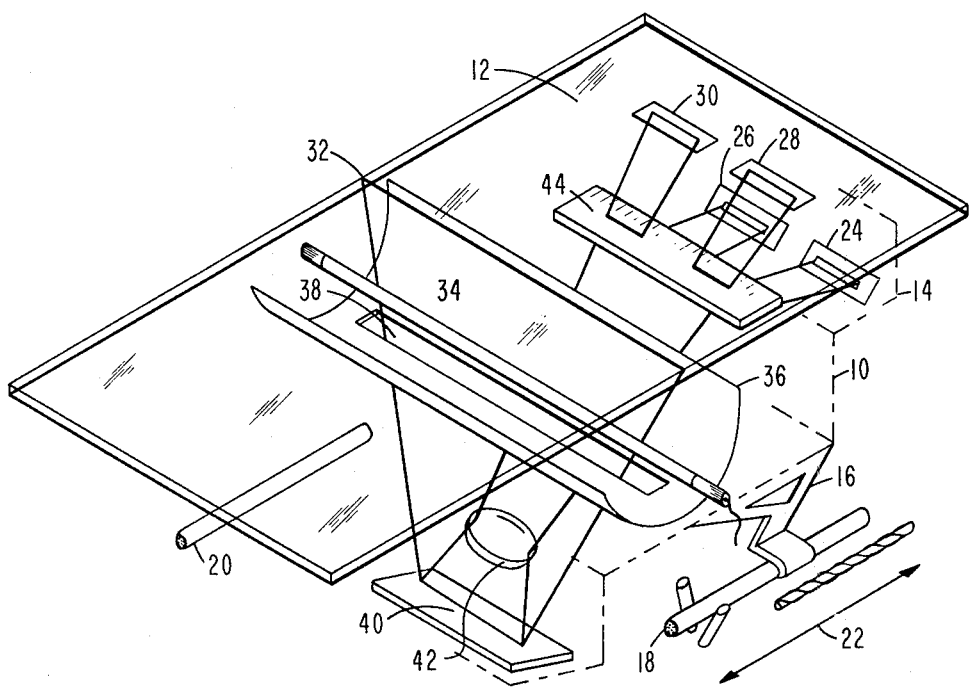
FIG. 1 shows an isometric schematic view of a multiple array scanner.

Referring now to FIG. 1, an examplary raster input scanner 10 is there shown. The examplary showing of FIG. 1 depicts only the necessary elements of the scanner. It should be understood that conventional components such as support frame, motive means, etc. can be easily supplied by people skilled in the scanner art. The scanner 10 includes a document platen 12. The document platen 12 is usually transparent and forms the object plane for the scanner. Documents to be scanned and reproduced are placed with the side containing the material to be reproduced facing downwardly as the moving assembly 14 scans the document. The moving assembly 14 is fixedly attached to support plate 16. The support plate 16 is journaled onto support rods 18 and 20 for slidable motion in the direction shown by arrow 22. The motive force for transporting the moving assembly along rods 20 and 22, respectively, are supplied by a motor via a cable pulley system, none of which is being shown in the figure.

Still referring to FIG. 1, the moving assembly includes an optical assembly and the linear arrays 24, 26, 28 and 30 respectively. As will be explained subsequently, for any line such as line 32 positioned on the document platen a composite video image is projected onto the multiple arrays. Although four arrays are shown in FIG. 1, any line of data, for example 32, on a document can be covered by two arrays.

In fact, for simplicity of explanation the present invention will be described using only two arrays to cover the width of a data line positioned on the document platen.

Still referring to FIG. 1, the optical assembly includes an illumination source 34. The illumination source illuminates a document which is placed on the document platen 12 for copying. The illumination outputted from the illumination source is reflected onto the document platen by the reflector 36. The reflector 36 is fitted with an elongated slot 38. As light rays are reflected from the document platen due to the non light absorbing characteristics of indicia situated on said document platen, light rays are reflected from the document through slit 36 and onto folding mirror 40. The folding mirror folds the light rays and directs them onto focusing lens 42. The lens focuses the light rays onto an optical splitter 44. The optical splitter divides the light rays so that for any pair of scanners, for example 24 and 30, or 26 and 28 an infinitisimal portion of the object is projected onto identical pixels in each array. Although not obvious from the drawing, the pixels which are representing adjacent sections of a continuous object such as line 32, seated on the document plane, are arranged in different planes and in an overlapping manner. It is worthwhile noting that although a specific scanner configuration is described, the present invention finds use with any type of multi array raster scanners. For example, the raster scanner described in U.S. Pat. No. 4,092,632.

As was stated previously, for ease of explanation each continuous object such as line 32 seated at the document plane will be projected onto two overlapping arrays such as arrays 24 and 28. However, any number of arrays may be used to cover the width of a line.

Referring now to FIG. 2 is a showing of the two arrays and the physical orientation necessary to reproduce a continuous image of a straight line object or data placed on the document glass. Each of the arrays are linear arrays which are readily available in the prior art. One suitable array is the Fairchild CCD121-1728 pixel two-phase linear array manufactured by Fairchild Corporation. The term pixel is a word of art used to define a photosensitive element of the array. Although the arrays are available in various lengths such as 1728 pixels and 1120 pixels none is currently available with a sufficiently long length to cover (that is span) a full line on a standard size sheet of paper for high resolution. Hence, at least two arrays are used for covering a continuous line on an original document.

Figure 2A:
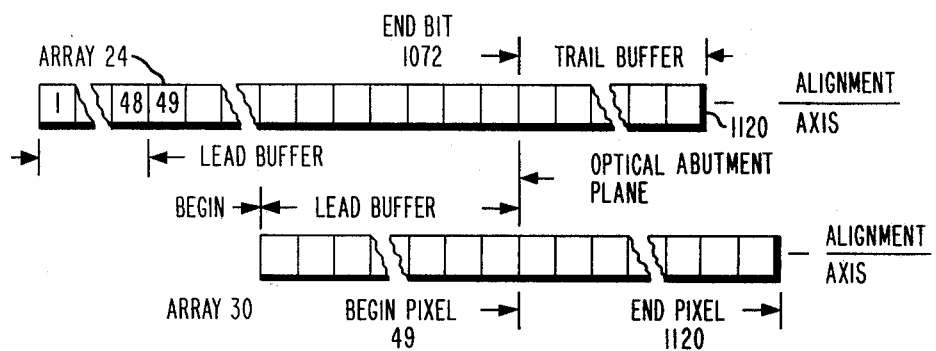
FIGS. 2A and 2B are an examplary showing of the overlapping configuration of the arrays in the optical image plane.

In FIG. 2A, array 24 is a linear array with 1120 pixels. The linear array is positioned symmetrical about its alignment axis. By way of example, only 1024 pixels of array 24 is used for scanning one section of a straight object such as a line of data on an original document. The unused 96 pixels of the array are equally distributed at the two ends of the array. Hence for array 24, bits 1 through 48 are unused. Bits 49 through 1072 are used and bits 1073 through 1120 are not used. In other words, array 24 comprises three sections. Two of the three sections are not used to scan a document while the third section is used. The section of the array which is used to scan a document, positioning at the document platen, is positioned between the two unused sections identified as a lead buffer and a trail buffer respectively. Although the pixel's count in each section may vary in one embodiment, 48 pixels are dedicated for the lead and trail buffers, respectively, while 1024 pixels are dedicated for the scanning section of the array.

Likewise, array 30 is identical to array 24 and is symmetrically positioned about its alignment axis. Since array 30 is identical to array 24, its configuration will not be described. Array 30 is positioned relative to array 24 so that the unused bits 1 through 48 (that is the lead buffer) are positioned to overlap with the pixels in array 24. When a straight object line on an original document is projected onto arrays arranged in the configuration shown in FIG. 2A, identical portions of the same object are projected onto each of the arrays. The overlapping portion of the arrays retains redundant data relative to the section of the data line projected thereon. It is, therefore, necessary to select the first pixel in array 30 so that crossover from array 24 to array 30 is effectuated. The configuration shown in FIG. 2A depicts an ideal situation wherein the end pixel, that is pixel 1072 in array 24 is properly abutted with pixel 49 in array 30 along the optical abutment plane. As such, the video image of a continuous object line would be generated from bit 49 through 1072 of array 24 and from bit 49 through 1072 of array 30. It should be noted that the configuration shown in FIG. 2 is merely examplary. It being understood that it is within the skill of the art for a skilled designer to use any length array positioned the same in any configuration without departing from the teaching of the present invention.

Figure 2B:
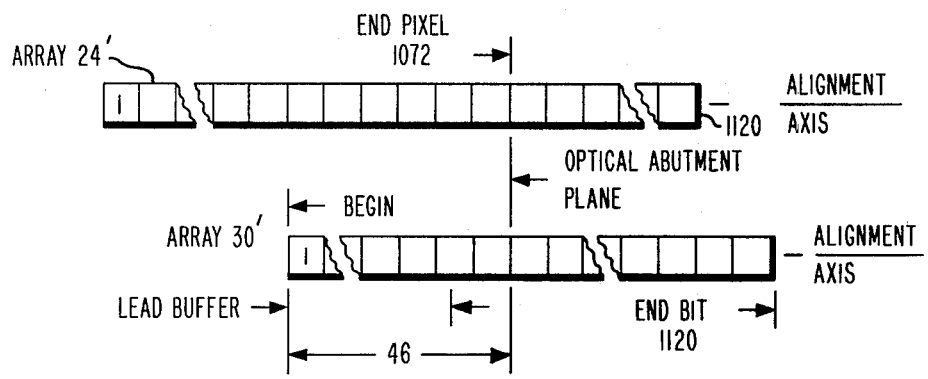

The configuration in FIG. 2A shows the ideal configuration where the two arrays are optically abutted. This means that there is no separation or overlap at the crossover zone between array 24 and array 30. In other words, no adjustment is needed at the crossover zone. However, in practice this utopian relationship is not achieved and adjustment is required at the crossover zone. In FIG. 2B the arrays 24' and 30', respectively, are not in optical abutment. Since the configuration of arrays 24' and 30' are identical with previously described arrays 24 and 30, respectively, these arrays will not be described in detail. Suffice it to say that array 30' is positioned relative to array 24' so that some of the pixels in the overlapping area 46 include pixels from the image sections of arrays 24' and 30' respectively. Whereas the starting bit in the second array of FIG. 2A was pixel 49, this condition is no longer true in the misaligned arrays shown in FIG. 2B. This is particularly true since bit 49 falls within the active pixel of array 24'. It, therefore, becomes necessary to determine the cross over point (that is the optical abutment plane) where the beginning pixel in array 30' be used in forming a continuous video image of the object. It is this problem that the present invention addresses.

Figure 3:
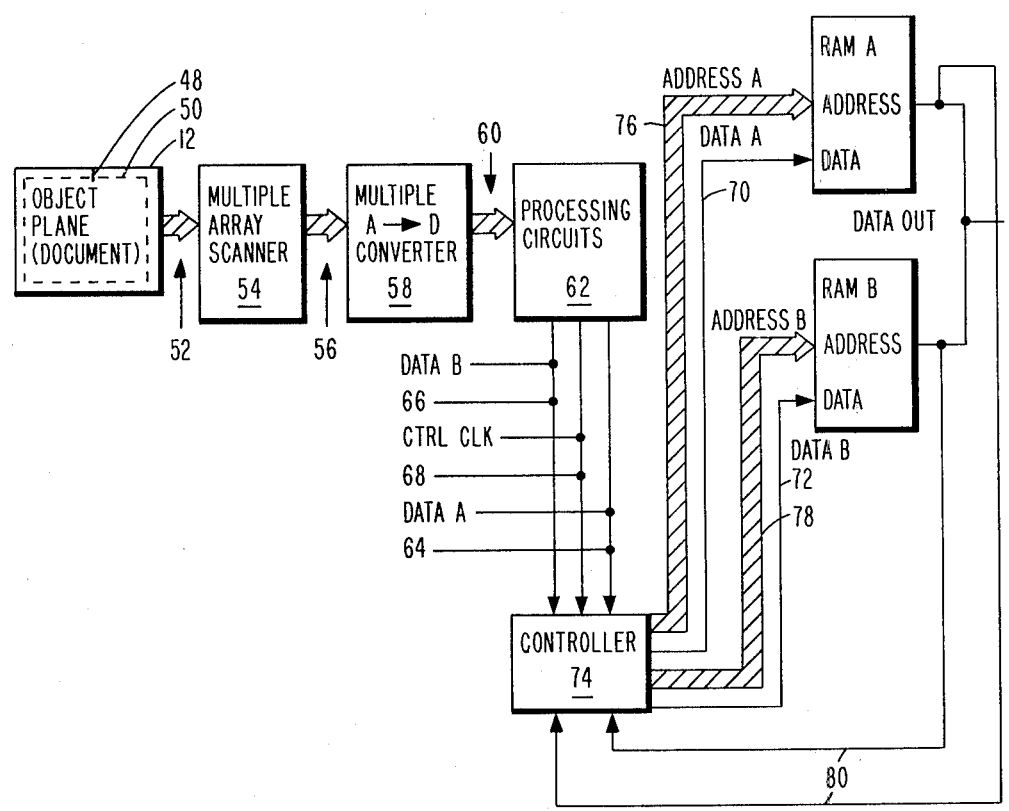
FIG. 3 is a block diagram showing the interrelationship between the components of the present invention.

Turning now to FIG. 3, a block diagram according to the present invention is shown. In this figure, elements which are common to previously identified elements are assigned the same numeral. In the figure the document platen or object plane 12 is fitted with a test pattern 48. In one embodiment the test pattern 48 is a vertical line scribed onto a sheet of white paper 50. As will be described hereinafter, when the solid line is projected onto the arrays positioned in overlapping fashion as is described and shown in FIGS. 2A and 2B, respectively, the line generates a footprint equivalent to its width onto the arrays. The footprint is used to generate the optical abutment plane. The optical abutment plane defines the crossover point whereat pixels from consecutive arrays are used to create a continuous optical image of a straight line or object.

Still referring to FIG. 3, light rays reflecting from the document platen 12 are fed along the optical path 52 and are focused onto the arrays in multiple array scanner 54. The optical path 52 is fitted with conventional optical elements such as those previously described in relationship with FIG. 1. The multiple array scanner 54 is fitted with at least two linear arrays arranged in overlapping manner as is described above. The video output from multiple array scanner 54 is fed over multiplexor buss 56 into multiple analog to digital (A–D) converter 58. The multiple A–D converter 58 is fitted with a plurality of conventional A–D converters each one of which is dedicated to converting the output from each pixel in the multiple array scanner to a digital value. The digital value is multiplexed over multiplexor buss 60 into processing circuit 62. It should be noted that the digital output from each A–D converter is now identified as a bit. Of course, each bit is associated with the output of a pixel in the multiple array scanner.

The processing circuits 62 receive the bits on multiplexor line 60 and arrange the bits into groups of 16 bits. The processing circuit further generates a clocking scheme whereby each cycle in the clock is associated with the 16 bits of information. The clock is further divided so that a pulse having a predetermined width is associated with a particular bit. Stated another way, each data bit is identifiable with a particular clock pulse. Of course, other conventional means may be used for correlating the data outputted from the multiple A–D converter 58 with a suitable data clock.

The data is now fed out into sequential streams from processing circuit 62. Data A is fed out on data buss 64. Data B is fed out on Data buss 66. The control clock associated with the data is fed out on control buss 68. The data on buss 64 is transmitted over buss 70 into a random access memory (RAM) A. Likewise, data B is stored into RAM B over buss 72. RAMS A and B are commercially available RAMS. Each RAM is purchased with its own address decoding scheme and its own memory control scheme. Since the RAMS are conventional and/or commercially available their configuration will not be described hereinafter. Suffice it to say that the preferred width of the RAM is at least wide enough to accommodate a full line of data. By way of example, a commercially available RAM which would be acceptable is the MCM 6810 RAM manufactured by the Motorola Semiconductor Products Inc. The address in the RAMS where data A and data B is to be stored respectively is generated by controller 74 and outputted on address buss 76 and 78, respectively. By manipulating the relative address in memory where data A and data B is stored, the controller 74 abuts the electronic image representing a line of data scanned at the document plane. Feedback loop 80 generates feedback error information to the controller. The controller uses the error information to generate a correction factor which is used to modify the memory address to ensure an optically abutted electronic image of an original straight line.

Instead of using RAM A and RAM B for storing data A and data B, respectively, an alternate embodiment would be to use a single RAM having sufficient storage cells and partition the RAM so as to dedicate one section to data from data buss 70 and the other section to data from data buss 72. In this arrangement only one address bus is needed.

Figure 5:
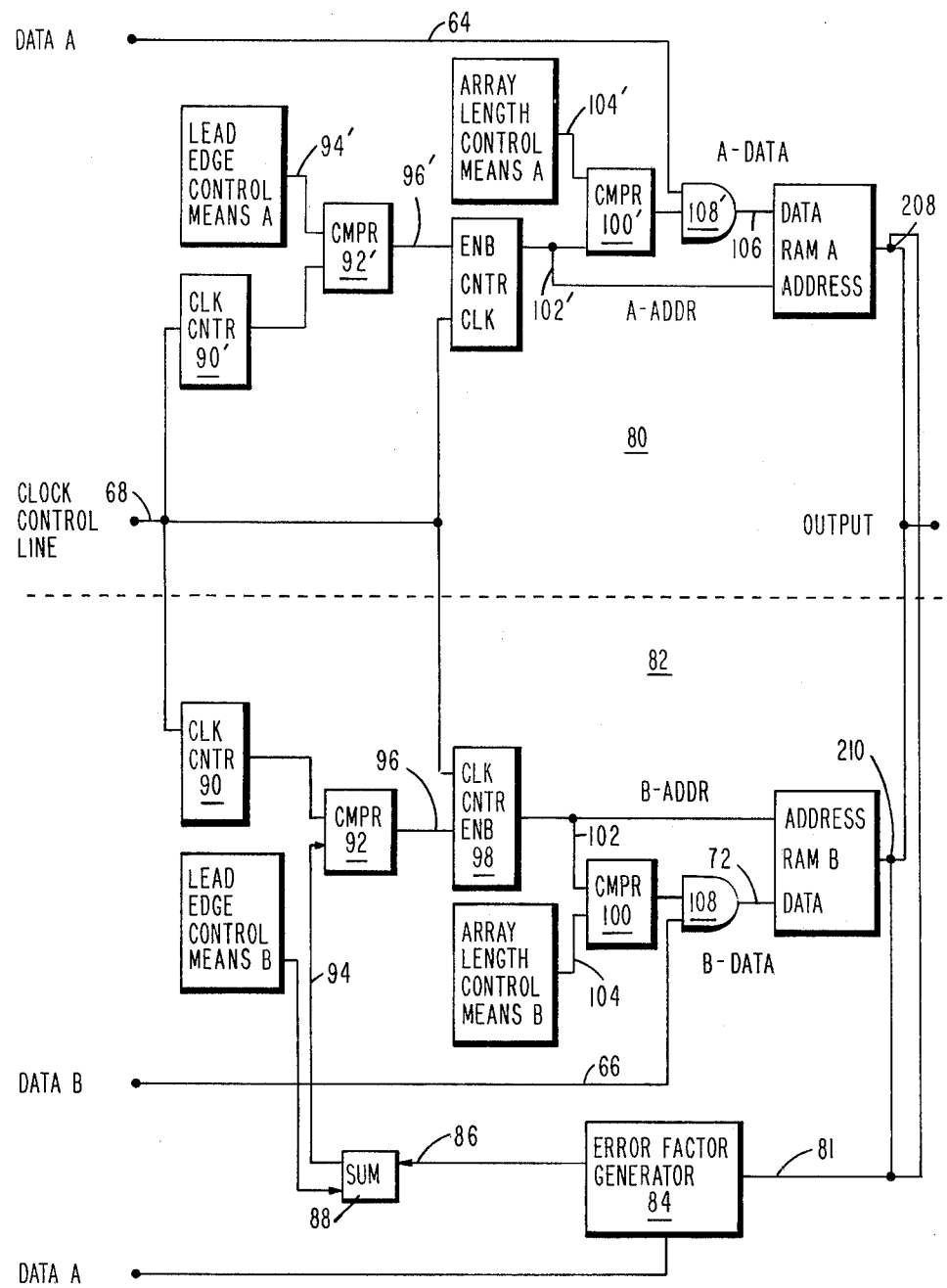
FIG. 5 shows, in detail, the controller and the storage used to effectuate abutment and to generate a continuous image.

Referring now to FIG. 5, the detail of one embodiment of controller 74 is shown. As was stated previously, the controller generates storage address where data A is to be stored in RAM A and sends both data and address over to RAM A. Likewise, controller 74 generates address location for RAM B and data for RAM B. The data for RAM B is sent over data buss 72 while the address for RAM B is sent over the B address. RAM A is dedicated to store data generated from one array such as array 24' (FIG. 2B). Similarly, RAM B is dedicated to store data generated from a next array such as array 30'.

As is evident in FIG. 5, controller 74 which loads RAM A and RAM B are divided into two symmetrical halves 80 and 82, respectively. Since the circuit components in each half are identical excepting for the feedback loop 81 and the feedback error factor generator associated therewith, only one of these circuit halves will be described hereinafter.

For purposes of discussion, in the first instance, assume that the error factor outputted from feedback error factor generator 84 onto conductor 86 has no effect on the algebraic summing network 88. It should be noted that data A is the data generated from arrays 24 or 24' (FIGS. 2A and 2B) while data B is the data generated from array 30 or 30'. Due to the misalignment between the two arrays, the controller 74 generates the proper electronic abutment for the data outputted from said arrays. Circuit 82 of the controller 74 includes clock counter (CLK CNTR) 90 the output of which is fed into comparator (CMPR) 92. The other input to comparator 92 is on conductor 94. Since it is assumed that the error correction factor on conductor 86 has no effect on summing circuit 88, the signal on conductor 94 is, in effect, the output from lead edge control means B. As such, the signal on conductor 94 is identical to the signal on conductor 94'. The function of the lead edge control means is to mask the leading pixels (the lead buffer FIGS. 2A, 2B) in array 30'. For example, lead edge control means A masks the signal outputted from the first 48 pixels in array 24' while the lead edge control means B masks the first 48 pixels in array 30'. In one embodiment of the present invention, the lead edge control means B is a bank of switches the setting of which represent the number of data bits (pixels) to be skipped on data buss B (outputted from array 30'). It should be understood that the setting on lead edge control means B and lead edge control means A need not be 48. Also, the setting on lead edge control means A and lead edge control means B need not be the same. The setting is dependent on the size (that is number) of pixels dedicated to the buffer sections of the scanning arrays. The output from lead edge control means B is fed into comparator 92. Likewise the output from CLK CNTR 90 is fed into comparator 92. The comparator 92 is a greater than comparator. This means that when the count outputted from clock counter 90 is greater than the count outputted from the register associated with the switches of lead edge control means B, comparator 92 will output an enabling signal on conductor 96. As was stated previously, each clock pulse on the clock control line is associated with a data bit on the data line. As such when the count in the counter is equal or greater than the count on conductor 94, a pulse will be outputted on conductor 96. This pulse enables clock counter 98. The counter begins to count and generates the B address for RAM B. Until a compare is made in comparator 92, clock counter 98 will remain inactive. For example, at a value zero or some other present value as required. Thus, the memory address for RAM B remains constant and all unwanted data is repetitively loaded into one address. Once the compare in comparator 92 is achieved, the counter 98 will increment thereby incrementing the address in RAM B. Data will be loaded sequentially into this address until a necessary compare is made in comparator 100 with the output from array length control means B. The array length control means B identifies the number of pixels in the B array that is active. In other words, the count in array length control means B reflects the active length of the B array used for scanning a section of a line at the document plane of the scanner. For example, in FIG. 2B the array length control means B would be set to 1024. Of course, any other setting may be used. In one embodiment of the present invention, the array length control means B is a bank of switches. As soon as the count on terminal 102 is greater than or equal to the signal outputted from the array length control means B on terminal 104 a signal is outputted from comparator 100 on conductor 106. The signal on conductor 106 which identifies the end of the active area of the array is gated with the B data line by gating means 108 to mask out any more data from the B array. In one embodiment of the present invention, the gating means is an "AND" circuit.

Having described how RAM A and RAM B are loaded by controller 74, the data in the RAM is generally not in proper optical abutment. The feedback loop 80, together with feedback error factor generator 84 generates an error correcting factor which is fed into summing means 88 to generate a new address where the stored electronic image of array 30' is to be accessed in order to form a continuous straight image of an original data line.

Figure 4A:
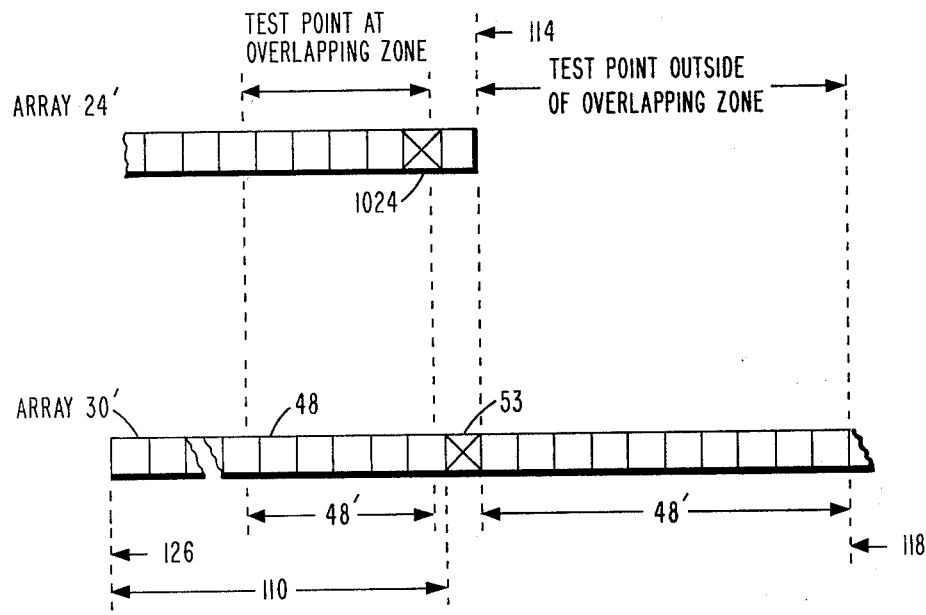
FIGS. 4A and 4B show the effect of the footprint of the test pattern on the arrays. This diagram is helpful in understanding the invention.
Figure 4B:
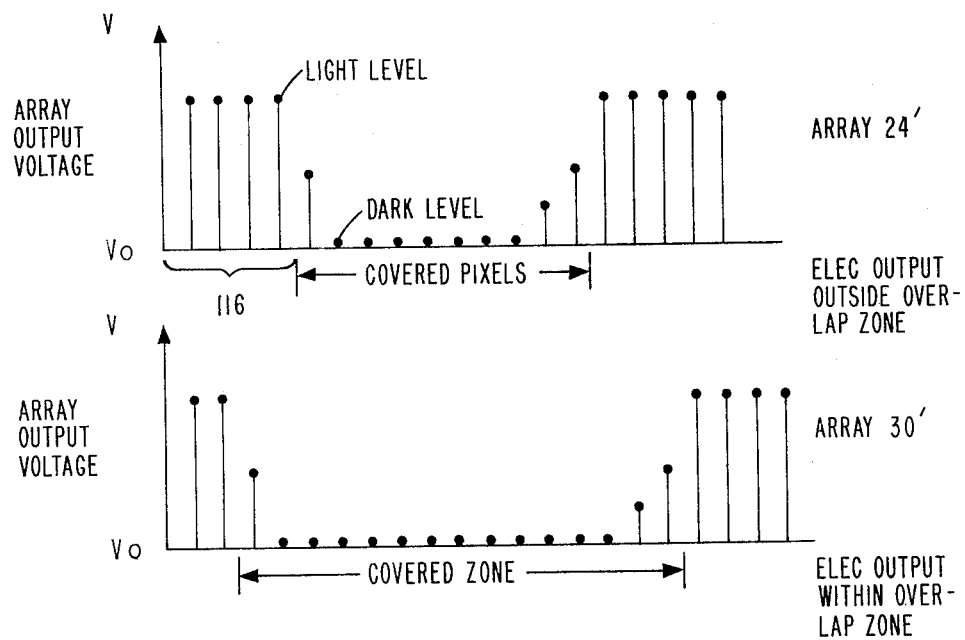

Before addressing the means used for generating the feedback error correcting factor, it is worthwhile turning to FIGS. 4A and 4B. FIG. 4A demonstrates a footprint 48' which the vertical line 48 (FIG. 3) casts on arrays 24' and 30' as the vertical line is moved at different test zones on the document plane. FIG. 4B shows the electrical output from the arrays as the vertical line is positioned at various points.

FIG. 4A is a grossly exaggerated showing of how the footprint 48' appears when a line 48 is positioned at the object plane of the scanner (see FIG. 3). It is worthwhile noting that the pixels in array 24' and array 30' are also exaggerated. In reality, the size of the pixels are within the range of a few tenths of one mils. Also the width of the footprint is much narrower than the showing in the Figure. As is evident from the drawing, array 24' and array 30', as previously discussed, are orientated in an overlapping manner. Due to mechanical misalignment between array 24' and array 30' the pixels in array 30' are (at least in the overlapping zone) slightly offset with respect to the pixels in array 24'. For description purposes it is assumed that Array 24' is the referenced array. The array covers the left section of a line to be scanned beginning at the left margin towards the right margin. The other portion of the line beginning from the last pixel in array 24' to the right margin is covered by Array 30'. Of course, any other type of configuration may be used. The object is to obtain the optical abutment plane (FIGS. 2A and 2B) so that the ending pixel in array 24' and the beginning pixel in array 30' can be determined to generate a continuous image of a continuous subject. The vertical line 48 (FIG. 3) is positioned at a location on the document plane outside of the overlapping zone 110 (FIG. 4A). A footprint 48' is projected onto the array 30'. In FIG. 4A 48' is an exaggerated representation of the appearance of the actual footprint. The footprint 48' will affect the electrical characteristics of the pixels which is covered. Since the output from the pixels is proportional to the quantum of light which is incident on said pixels, then the light which is reflected from the document plane of the scanner will cause the pixels upon which the light is incident to output a relatively high electrical signal. Likewise, the electrical output from the pixels which are covered by the footprint 48' will be relatively low in comparison to the signal outputted from the pixels which are not covered. In fact, the output from the pixels which are covered by the footprint is ideally zero.

Turning for the moment to FIG. 4B is a conceptual showing of the output derived from array 24' and array 30'. The vertical axis represents Output Voltage generated from each pixel in the array and the horizontal axis represents pixel count. First consider the situation where the vertical line 48 (FIG. 4) is positioned on the document platen to be outside of overlapping zone 110 (the first test point) and cast a footprint 48' (FIG. 4A) over the pixel of array 30'. Assuming that the pixels in array 30' are viewed from left to right as is identified by arrow 112 (FIG. 4B), as one approaches the left edge 114 (FIG. 4A) of the footprint 48' there is no reflection on the pixels of array 30'. As such the output from pixels 116 is relatively high (Say 5 volts). The output for each pixel is shown by a separate vertical line or a dot on the horizontal axis. As left edge 114 (FIG. 4A) is approached the output voltage from the pixel's is decreased, say $V_1$. As one moves into the pixels which are covered by the footprints the output is reduced to a substantial low value in volts. The output voltage remains at the low value for the covered pixels until the right edge 118 (FIG. 4A) of the footprint is passed whereby the output from the non-obstructed pixels revert back to the relatively high voltage level. By counting the number of pixels having a low output value ($V_0$ to V) volts the pixels which are covered by the footprint 48' are determined. The count also reflects the width of the vertical line 48. In the example of FIG. 4A and FIG. 4B, the count is 10 pixels.

The next test point is that the vertical line 48 is moved on the document platen (FIG. 3) so as to cast its footprint 48" (FIG. 4A) in the zone where array 30' and array 24' are overlapped. Using the same process outlined above the number of pixels which are covered by the footprints of 48" is determined. The number of pixels covered at this test point is greater than the number of pixels covered at the first test point. The number of pixels is 15. The error factor which is needed to determine the proper crossover pel is the difference between the pels counted at the first test point located outside of the overlapping zone and the pels counted at the second test point (located at the overlapping zone). For the example shown in FIGS. 4A and 4B, the error equals 10 minus 15. The error factor is, therefore, minus 5 pels. The negative sign means that there is an overlap condition at the crossover point. This means that the count in the array length control means B must be increased by 5 pels to determine the crossover pel in array 30'.

In the example shown in FIGS. 4A and 4B, it is assumed that pel 1024 of array 24' is the last pel used in array 24' for generating a continuous object. Likewise, it is assumed that pixel 48 is the first pixel used in array 30' for generating the continuous object. Since the error is 5 pixels and the sign is negative, this means that the abutment plane for the crossover point where the last pixel (that is pixel 1024) in array 24' and the first pixel in array 30' meets is 5 pixels down from pixel 48. As such, the electronics in reconstructing a continuous object would use pixels 49 through 1024 in array 24' and pixel 53 as the first or beginning pixel in array 30'. As such, the crossover abutment plane is properly determined and the abutment is achieved.

The other possible condition which may occur is that in setting up the relation between array 24' and array 30' the sign of the error factor is positive. The positive sign indicates a separation and in this situation adjustment is achieved by subtracting error count from the contents of the lead edge control means B (FIG. 5). By way of example, assuming that the count in FIG. 4A was a positive 5, the positive sign would indicate overlap and indicates that the proper crossover pel occurs five pels down from pixel 48 in the direction of arrow 126 (that is pixel 43).

Once the error correcting factor and sign is determined, the number is fed into summing circuit 88 of FIG. 5 to adjust the position in RAM B where the data outputted from array 30' should be stored to effectuate proper crossover and abutment.

Figure 6:
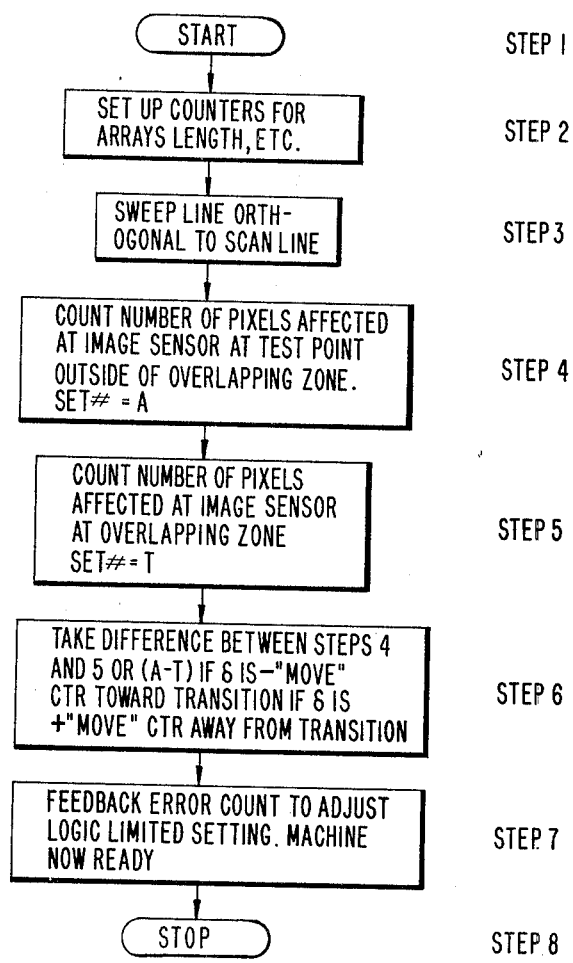
FIG. 6 shows a logical flow chart used to generate a feedback error count.

Referring now to FIG. 6 is a showing of a system flow chart. The flow chart describes the various steps which have to be taken in order to generate the error signal which is needed to define the crossover pixel between overlapping arrays. It should be noted that in practice the misalignment between the pixels are usually within the range of a few pixels and, therefore, at some point within the overlap zone of the arrays there is an abutment plane where the ending pixel in the first array and the beginning pixel in the second array can be chosen to effectuate abutment. The effect of the vertical line 48 (FIG. 3) is to force alignment between the two arrays. Referring now to FIG. 6, step 1 is the starting step where preparation is made to begin the process steps which are necessary to generate the previously described error count. Step 2 requires that the counters identifying the array length and the buffer zones be set up. With reference to the controller circuit shown in FIG. 5, this means that the count in lead edge control means and in the array length control means be set up. Also, the memory address where data will be stored can be selected. Step 3 the line 48 (FIG. 3) is swept orthogonally to a scan line on the object plane. By sweeping the line a footprint of said line is projected onto the array. In step 4 the number of pixels which is effected when the line in step 3 is outside of the arrays overlapping zone is counted. Assume the count is A.

Step 5—a second count is taken at a test point when the vertical line is within the arrays overlapping zone (see FIG. 4A). Assume the count is T.

Step 6 requires that the difference between Steps 4 and 5 (A-T) be taken. The difference is set equal to $\sigma$ (sigma). For $\sigma$ positive there is overlap and the cross-over pixel is determined by increasing the counts in the counter pre-set in Step 1 above to reflect the buffer zone of the non-referenced array. If the count is positive then a separation occurs and the adjustment is taken by decreasing the pre-set count. In FIG. 5 the count set by the lead edge control means is adjusted.

In step 7 once the error count is determined it is fed back to modify the referenced count set in step 2. The machine is now ready to process data.

Figure 7:
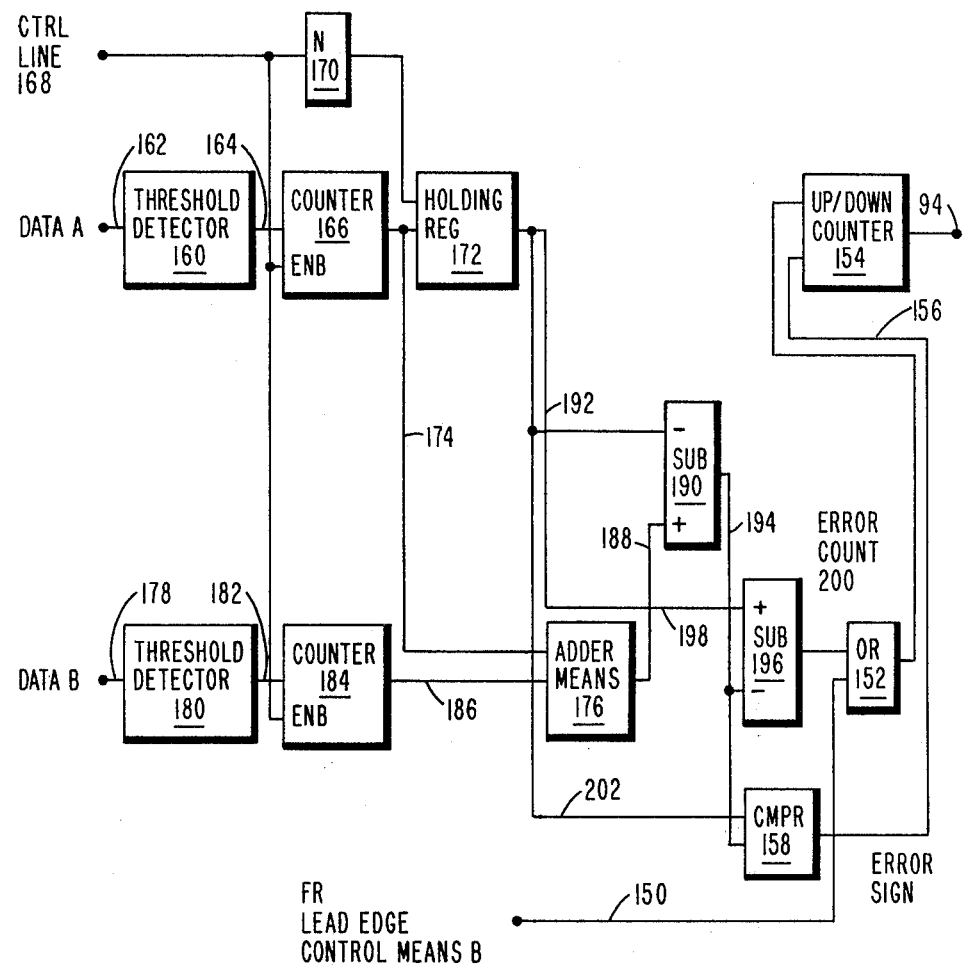
FIG. 7 shows, in detail, the circuits used to generate the error count.

Referring now to FIG. 7 one embodiment of the error factor generator 84 (FIG. 5) is shown in greater detail. As was stated previously, during a test scan or abutment scan an indicia such as a vertical line is positioned at various test points on the document platen of the scanner. The test points are selected so that a footprint generated by the vertical line is projected onto one of the arrays at a point outside of the overlapping zone. Likewise, a test point is selected so that the footprint generated by the vertical line is projected onto the arrays at a point within the overlapping zones of the array. The number of pixels outputting electrical signals at the test point due to the footprint generated by the indicia at the object plane is counted. The algebraic difference between the counts at the overlapping zone and outside of the overlapping zone is determined and is used as the error factor for adjusting the count which was previously set by the lead edge control means. The initial count which was set by the lead edge control means is a mere assumption of the number of pixels which should be masked in the second array in crossing over between the first and second arrays respectively. However, the actual cross over point is determined by adjusting the previous count by the error factor. Referring now to FIG. 7, DATA B is generated from array 30' (FIG. 2B) while DATA A is generated by array 24' (FIG. 2B). The signal on conductor 150 is set by lead edge control means B and determines the number of pixels whose output is masked in the array which generates DATA B. The number is transmitted through logical "OR" gate means 152 into the up/down counter 154. At this instance the signal on conductor 156 is in a down state since comparator (CMPR) 158 is inactive. With the signal on conductor 156 in the down state, the up/down counter counts upwards until its contents are equivalent to the setting of the lead edge control means B. The output on conductor 94 is equivalent to the count in the up/down counter and is used in the manner previously described by comparator 92 (FIG. 5).

Assume now that the indicia previously described is positioned on the document plane so that it cast a footprint onto array 24' which generates DATA A (FIG. 7). As was stated previously, the output signal from the elements in the active zone of array 24' other than those elements upon which the footprint is projected will be below a certain threshold value, substantially zero volts. The threshold detector 160 (FIG. 7) is, therefore, set at this predetermined threshold level. As data signal is outputted on conductor 162, only those signals having a threshold greater than the setting of the threshold detector 160 will be outputted on conductor 164. The signal on conductor 164 is fed into counter means 166. Each signal on conductor 164 identifies an element of the array which is covered by the footprint of the vertical line. The total count is equivalent to the number of elements which the footprint of the vertical line covered at the image plane of the scanner.

Simultaneously, with the generation of the signal on conductor 164, a control pulse is generated on control line 168 and enables counter 166 to count the pulse on conductor 164. The control pulse on control line 168 which enables counter means 166 is fed through inverter means 170 to disable holding register 172. Stated another way, while counter 166 is enabled to count holding register 172 is disabled so that the count in counter 166 is not transferred into holding register 172. As soon as the control pulse on line 168 goes away holding register 172 becomes active and the count trapped in counter means 166 is transferred into the holding register. Also a count in counting means 166 is also loaded over conductor 174 into adder means 176.

The second test position is now selected at the document plane so that as the scanner scans the document plane, the footprint cast by the vertical line is now located at the overlapping zone of the array. At this point the elements in both arrays are active and, as such, data is also outputted on conductor 178 (FIG. 7). In a similar manner as was previously described, the threshold detector 180 inhibits signals falling below a predetermined threshold level from appearing on conductor 182. As such, the signal on conductor 182 indicates the pixel covered by the footprint in array 30' (FIG. 2B). The signals on conductor 182 are fed into counting means 184. Simultaneously with the feeding of signals on conductor 182 into counting means 184, a control signal on line 168 enables counter means 184 to count. Likewise, signals which are outputted from array 24' are being counted by counter 166. The output from counter means 184 and counter means 166, are transferred over conductor 174 and 186, respectively, into adder means 176. In order to correct for the contents of holding register 172, which was previously loaded into adder means 176, the output from adder means 176 which signifies the sum of the count on terminal 174 and 186, respectively, is fed over conductor 188 into subtractor circuit means 190. Subtractor circuit means 190 subtracts the counts on conductor 192 from the count on conductor 188. The result is transmitted over conductor 194 to subtractor (SUB) 196 and comparator (CMPR 158). The count in subtractor 196 which is supplied on conductor 194 is the count generated when the vertical line is positioned at the overlap zone of the arrays. Likewise, the count on conductor 198 is the count generated when the vertical indicia was positioned at the test point outside of the overlapping zone. The difference count which is outputted on conductor 200 is the error count which is used to adjust the count in up/down counter 154. The error count is the difference between the count on conductor 198 and the count on conductor 194. In order to determine the sign (positive or negative) of the count, the count in holding register 172 is fed into comparator (CMPR) 158 over conductor 202. The count on conductor 202 is compared with the count on conductor 194. The comparator 158 is a greater than comparator. This means that if the count on conductor 194 is greater than the count on conductor 202, a sign pulse is outputted on conductor 156. The sign pulse on conductor 156 forces the up/down counter to count downwards, i.e., subtract the value of the count generated on conductor 200 from the contents of up/down counter 154. Similarly, if the count on conductor 194 is not greater than the count on conductor 202, the output from comparator 158 will be down which forces up/down counter to count upwards, that is to increase the contents of up/down counter 154 by the error count outputted on conductor 200.

In an alternate embodiment of the invention, the error factor generator (FIG. 5) is a monitoring device (not shown). The monitoring device may be a cathode ray tube or any other type of monitoring device capable of displaying on a display screen the dual electronic images of the signals outputted from the linear arrays of the scanner when the vertical line is positioned at the test point outside of the overlapping zone and at the test point located at the overlapping zones, respectively. Of course, the outputted signal would be stored in Ram A and Ram B respectively. By attaching the monitoring device at points 208 and 210, respectively, (FIG. 5) the electronic images showing the overlap between the arrays is viewed. Also, the number of overlap or separation which occurs in the video signal is viewed by an operator and the error count is added or subtracted to the count which was previously set by the lead edge control means B to effectuate proper abutment.

In still another embodiment of the present invention, the error factor generator 84 is replaced by a micro computer such as the Intel 8080 microcomputer. This microcomputer is a well known microcomputer which has its own instruction set and is manufactured by the Intel Corporation. The microcomputer is interconnected to Ram A and Ram B through a set of registers which interrogate the RAMS for the storage location of the data stored during the abutment cycle of the scanner. The microprocessor then uses the method previously described to change the storage address so as to effectuate abutment. By following the previous described method, it is within the skill of the art to generate a program which forces the microprocessor to perform the necessary process steps.

OPERATION

In operation a reference pattern such as vertical lines 48 (FIG. 3) is positioned to be orthogonal to a scan line on the object plane of the scanner. A footprint of the line is projected onto the arrays. The vertical line is moved about on the object plane, first to a point outside of the overlapping zone of the arrays. The number of pixels which are affected by the footprint of the projected line is counted and stored. The line is next moved into the overlapping zone. In like manner, the number of pixels which are affected by the footprint is counted. The absolute value of the difference between the pixels generated outside of the overlapping zone and the number of pixels counted in the overlapping zone is generated. The absolute value (which is positive or negative) is used to determine the abutment zone where crossover occurs between the arrays so that a continuous object of a scanned line can be reproduced.

By using the present invention, the following benefits are achieved: Standard arrays can be used. The invention is automatic and dynamic. This means that abutment errors which occur due to impact of a scanner or temperature change can be done in the field without intervention of an overly skilled technician.

While the invention has been particularly shown and described with reference to preferred embodiments thereof, it will be understood by those skilled in the art that various changes in form and details may be made therein without departing from the spirit and scope of the invention:

Having thus described our invention, what we claim as new, and desire to secure by Letters Patent is:

1. In a scanner having a plurality of arrays with each array having a plurality of photosensitive elements, apparatus for electronically abutting an electronic image generated by the scanner; said apparatus comprising in combination:
   means for projecting a test pattern onto the arrays;
   means for generating an electronic image of the test pattern;
   memory means for storing the electronic image; and
   controller means associated with the memory means, said controller means being operable to assign predetermined memory address whereat the electronic images are being stored and operable to adjust the predetermined memory addresses thereby allowing abutment of the electronic images.

2. In a scanner having a plurality of multi-photosensitive element arrays, an apparatus for electronically abutting the images produced by the arrays comprising in combination:
   a movable indicia positioned at the document platen of said scanner;
   a means for projecting an optical footprint of the indicia onto the arrays;
   means for generating electronic signals indicative of the test indicia detected by the arrays; and
   means for electronically manipulating the signals outputted from the arrays to effectuate electronic abutment.

3. The apparatus claimed in claim 2 wherein the indicia includes a vertical line.

4. A method for abuting data scanned by the photosensitive elements of the overlapping arrays of a scanner comprising the following steps:
   selecting at least two test points located at the document platen of the scanner; one of said test points being at a location outside of the overlapping zone of the array and the other being at the overlapping zone;
   sequentially placing a vertical indicia at the selected test points;
   projecting a footprint of the indicia onto the arrays;
   generating a first count indicative of the electrical output from the photosensitive elements with the vertical indicia being positioned at the test point outside of the overlapping zone of the arrays;
   storing said first count;
   generating a second count representative of the electrical output from the photosensitive elements with the vertical indicia being positioned at the test point at the overlapping zone, generating an error count, from the first count and the second count; and using the error count to determine the crossover point between the arrays.

5. The method of claim 4 where the error count is being generated by the algebraic difference between the first and the second counts.

6. The method of claim 4 where the crossover point between arrays is being determined by the following steps:

storing a first count; said first count being indicative of the first photosensitive element to be used in the next array;

modifying the count by adding and/or subtracting the value of the error count therefrom.

7. Method for abutting the electronic images generated from the photosensitive elements of a multi-array scanner having the arrays arranged with linear zones and overlapping zones comprising the following steps:

projecting a footprint of a referenced indicia onto the arrays;

generating a first count indicative of the number of photosensitive elements covered by the footprint at a test point outside of the overlapping zone;

generating a second count indicative of the number of photosensitive elements covered by the footprint at a test point positioned at the overlapping zone;

taking the algebraic sum of the first and of the second count to generate an error count;

selecting a number indicative of the photosensitive element whereat crossover occurs between the arrays; and modifying the number with the error count to locate the actual crossover photosensitive element.

8. The method of claim 7 further including the step of selectively masking sections of the photosensitive elements so as to reproduce a continuous electronic image of a straight data line.

9. Apparatus for electronically abutting images outputted from the photosensitive elements of a plurality of linear arrays, comprising:

an addressable storage means;

address means associated with the storage means and operable to assign storage address at which data from the arrays are being stored;

means for generating a line of test data;

means to channel the test data to the assigned storage address;

control means to interrogate the storage and realign the test data so as to effectuate data abutment.

10. The apparatus of claim 9 where the addressable storage means includes at least two RAMS with each RAM dedicated to store data output from an assigned linear array.

11. The apparatus of claim 9 wherein the means for generating test data includes a vertical line.

12. Apparatus for abutting data outputted from a multiple array scanner comprising:

means for generating a test pattern;

storage means for storing the test pattern at predetermined storage address;

control means for storing the predetermined storage address;

error control means for generating an error signal; and means for receiving the error signal and modifying the predetermined address to achieve proper abutment between stored data.

13. Device for electronically abutting electronic images generated by a multiple array scanner comprising:

at least two linear arrays, each array having a leading buffer section, an active section and a trailing buffer section;

a vertical line positioned at the document plane of said scanner;

means for projecting a footprint of said line onto the arrays;

means for setting a count so as to mask electrical output signals from the leading buffer section of the arrays;

means for masking the electrical output from the trailing buffer section of the arrays;

means for storing electrical signals outputted from the active section of the arrays;

storage address means for defining storage addresses at which the electrical signals are being stored;

control means for interrogating the electrical signals outputted from the active section of the array and to generate an error signal therefrom; and means to receive the error signal and to adjust the count associated with the leading buffer section of at least one of the arrays to thereby effectuate electronic abutment of the electronic image outputted from the arrays.

14. A method for abutting the electronic images outputted from an array scanner having at least two arrays configured in overlapping manner comprising the steps of:

storing a predetermined count indicative of a crossover pixel between the arrays;

scanning a vertical pattern positioned at the document platen of said scanner;

generating a first count indicative of the electronic signals outputted from an array;

storing the first count;

generating a second count indicative of the electronic signals outputted simultaneously from the arrays;

storing the second count;

taking the algebraic difference of the first and the second count to generate an error count;

using the error count to adjust the predetermined count to thereby define the crossover pixel.

* * * * *